US009690009B2

(12) United States Patent
Asher

(10) Patent No.: US 9,690,009 B2
(45) Date of Patent: Jun. 27, 2017

(54) EFFICIENT WHITE LIGHT SCATTERING PHOTONIC BANDGAP CRYSTAL

(71) Applicant: UNIVERSITY OF PITTSBURGH—OF THE COMMONWEALTH SYSTEM OF HIGHER EDUCATION, Pittsburgh, PA (US)

(72) Inventor: Sanford A. Asher, Pittsburgh, PA (US)

(73) Assignee: University of Pittsburgh—Of The Commonwealth System of Higher Education, Pittsburgh, PA (US)

( * ) Notice: Subject to any disclaimer, the term of this patent is extended or adjusted under 35 U.S.C. 154(b) by 150 days.

(21) Appl. No.: 14/161,436

(22) Filed: Jan. 22, 2014

(65) Prior Publication Data
US 2015/0276983 A1  Oct. 1, 2015

Related U.S. Application Data

(60) Provisional application No. 61/755,303, filed on Jan. 22, 2013.

(51) Int. Cl.
| | |
|---|---|
| F21V 9/04 | (2006.01) |
| F21V 9/06 | (2006.01) |
| G02B 5/22 | (2006.01) |
| G02B 5/26 | (2006.01) |
| G02B 1/00 | (2006.01) |
| F21V 9/00 | (2015.01) |
| G02B 5/02 | (2006.01) |
| G02C 7/10 | (2006.01) |
| G02F 1/361 | (2006.01) |
| G03B 11/00 | (2006.01) |

(52) U.S. Cl.
CPC ................ *G02B 1/005* (2013.01)

(58) Field of Classification Search
USPC .......... 252/600, 582, 587; 356/38, 244, 301, 356/328, 337, 428; 359/350, 288; 423/566.1; 521/64, 183; 523/171, 202, 523/216; 528/30
See application file for complete search history.

(56) References Cited

U.S. PATENT DOCUMENTS

| | | | | |
|---|---|---|---|---|
| 6,014,246 A * | 1/2000 | Asher | ................ | G01K 11/06 359/288 |
| 2008/0108730 A1* | 5/2008 | Ben-Moshe | ............ | B01J 13/14 523/171 |
| 2011/0135888 A1* | 6/2011 | Xu | ........... | C08F 285/00 428/195.1 |

OTHER PUBLICATIONS

Sanford A. Asher, Jesse M. Weissman, Alexander Tikhonov, Rob D. Coalson, and Rasu Kesavamoorthy,Diffraction in crystalline colloidal-array photonic crystals, Physical Review E 69, 066619 (2004). © 2004 The American Physical Society.*

(Continued)

*Primary Examiner* — Bijan Ahvazi
(74) *Attorney, Agent, or Firm* — Paul D Bangor, Jr.; Clark Hill, PLC

(57) ABSTRACT

A photonic bandgap crystal or photonic bandgap crystal material comprising a self-assembled crystalline colloidal array (CCA) of monodisperse spherical particles having a face-centered-cubic (fcc) or a body-centered-cubic (bcc) lattice dispersed in a medium. The photonic bandgap crystal or photonic bandgap crystal material has a photonic bandgap for light in the visible and near-IR or a photonic bandgap for light in the visible range of wavelengths less than about 700 nm.

19 Claims, 5 Drawing Sheets

(56) References Cited

OTHER PUBLICATIONS

Jonathan G. McGrath, Robert D. Bock, J. Michael Cathcart, and L. Andrew Lyon, Self-Assembly of "Paint-On" Colloidal Crystals Using Poly(styrene-co-N-isopropylacrylamide) Spheres, Chem. Mater. 2007, 19, 1584-1591, © 2007 American Chemical Society.*

* cited by examiner

EFFICIENT WHITE LIGHT SCATTERING PHOTONIC BANDGAP CRYSTAL

CROSS REFERENCE TO RELATED APPLICATIONS

This application claims the benefit of the filing date of U.S. provisional patent application No. 61/755,303, filed on Jan. 22, 2013, the entirety of which is incorporated herein by reference for all purposes.

STATEMENT REGARDING FEDERALLY SPONSORED RESEARCH OR DEVELOPMENT

This invention was made with government support under grant #CHE-9633561 from National Science Foundation; DARPA grant #DAAG55-98-1-0025; and grant #N00014-94-1-0592 from the Office of Naval Research. The government has certain rights in the invention.

BACKGROUND OF THE DISCLOSURE

1. Field

The present disclosure generally relates to photonic bandgap crystals (PBGC) with a zero density of states for light in particular spectral regions (i.e. the bandgap regions), with special interest on PBGC with bandgaps in the visible and near-IR.

2. Background

Recent interest in the theory and fabrication of photonic bandgap crystal (PBGC) materials stems from their potential utility for creating revolutionary new paints, coatings and/or optical devices. A major goal is for the development of improved PBGCs and PBGC materials and methods for fabricating the same having zero density of states for light in particular spectral regions (i.e. the bandgap regions), with special interest on PBGCs with bandgaps in the visible and near-IR.

SUMMARY OF THE INVENTION

In a preferred aspect, the present disclosure comprises a photonic bandgap crystal or photonic bandgap crystal material comprising a self-assembled crystalline colloidal array (CCA) of monodisperse spherical particles having a face-centered-cubic (fcc) or a body-centered-cubic (bcc) lattice dispersed in a medium.

In another preferred aspect, the photonic bandgap crystal or photonic bandgap crystal material has a photonic bandgap for light in the visible and near-IR.

In an additional preferred aspect, the photonic bandgap crystal or photonic bandgap crystal material has a photonic bandgap for light in the visible range of wavelengths less than about 700 nm.

In another preferred aspect of the photonic bandgap crystal or photonic bandgap crystal material, the monodisperse spherical particles comprise polystyrene.

In yet an additional preferred aspect, the photonic bandgap crystal or photonic bandgap crystal material further comprises a polymerized CCA in a hydrogel wherein the photonic bandgap crystal or photonic bandgap crystal material has lattice constants and diffraction wavelengths tunable via temperature or binding of chemical species.

In another preferred aspect, the photonic bandgap crystal or photonic bandgap crystal material is tunable via hydrolysis.

In a further preferred aspect, the photonic bandgap crystal or photonic bandgap crystal material comprises a self-assembled CCA of monodisperse polystyrene spheres polymerized in an acrylamide hydrogel.

In another preferred aspect of the photonic bandgap crystal or photonic bandgap crystal material, the acrylamide hydrogel is partially hydrolyzed.

In a further preferred aspect of the photonic bandgap crystal or photonic bandgap crystal material, the acrylamide hydrogel volume or the CCA lattice constant is tunable via hydrolysis.

In another preferred aspect of the photonic bandgap crystal or photonic bandgap crystal material, the photonic bandgap spectral region is reversibly tunable.

In an additional preferred aspect of the photonic bandgap crystal or photonic bandgap crystal material, the refractive index of the spherical particles is different, smaller or greater than the refractive index of the medium.

In a further preferred aspect, a paint or coating comprises a base and a photonic bandgap crystal or photonic bandgap crystal material comprising a self-assembled crystalline colloidal array (CCA) of monodisperse spherical particles having a face-centered-cubic (fcc) or a body-centered-cubic (bcc) lattice dispersed in a medium.

In a further preferred aspect, the present disclosure comprises a method of forming a photonic bandgap crystal or photonic bandgap crystal material comprising self-assembling monodisperse charged spherical particles having a strong acid group on their surfaces into a crystalline colloidal array (CCA) dispersed in a medium where the medium may preferably comprise a low ionic strength aqueous solution.

In another preferred aspect of the method, the CCA comprises a face-centered-cubic (fcc) or a body-centered-cubic (bcc) lattice.

In yet another preferred aspect, the method further comprises polymerizing a hydrogel polymer around the CCA and hydrolyzing the hydrogel in-whole or in-part.

In another preferred aspect of the method, the monodisperse charged spherical particles comprise polystyrene and the hydrogel comprises a polyacrylamide.

In yet another preferred aspect, the method further comprises reversibly tuning a photonic bandgap spectral region of the photonic bandgap crystal or photonic bandgap crystal material via thermal or chemical treatment of the hydrogel.

DETAILED DESCRIPTION

In the following detailed description, reference is made to the accompanying examples and figures that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "disclosure" merely for convenience and without intending to voluntarily limit the scope of this application to any single disclosure or inventive concept if more than one is in fact disclosed.

The following description is, therefore, not to be taken in a limited sense, and the scope of this disclosure is defined by the appended claims.

According to preferred embodiments of the present disclosure, 3-D PBGCs have been fabricated which show a bandgap throughout the visible spectral region at wavelengths less than about 700 nm. In a preferred embodiment, such PBGCs were fabricated by the crystalline colloidal array (CCA) self-assembly of polystyrene spheres into a face-centered cubic (fcc) lattice in water or in a low ionic strength aqueous solution. Also fabricated was a tunable PBGC created by polymerizing the CCA within an acrylamide hydrogel, which was hydrolyzed to tune the hydrogel volume, the CCA lattice constant, and the bandgap spectral region. The observed 3-D bandgap in these systems must derive from lattice distortions and disorder within the CCA, since theoretical simulations indicate that the occurrence of a full 3-D PBGC requires much larger refractive index contrasts and cannot occur for unperturbed fcc lattices.

The PBGC concept originates from an analogy with the electronic bandgaps in semiconductors, which are due to electron diffraction by the crystal lattice. Similar diffraction by a periodic modulation of the dielectric constant will give rise to similar photon bandgaps. Electromagnetic radiation with frequencies within the bandgap will be unable to propagate and will be excluded from the material. The extensive theoretical investigations into the material requirements for PBGCs indicate that significant challenges must be surmounted to successfully fabricate PBGCs for the infrared (IR) and visible spectral regions, because only a small number of crystal structures will possess complete bandgaps, and extremely high refractive index modulations will be required. Yablonovitch et. al. were able to mechanically fabricate three-dimensional PBGCs for the microwave region by creating a diamond structure of air holes within a plastic matrix, but no examples of a 3-D PBGC with a complete bandgap in the visible or IR spectral regions have heretofore been reported.

Figure 1:
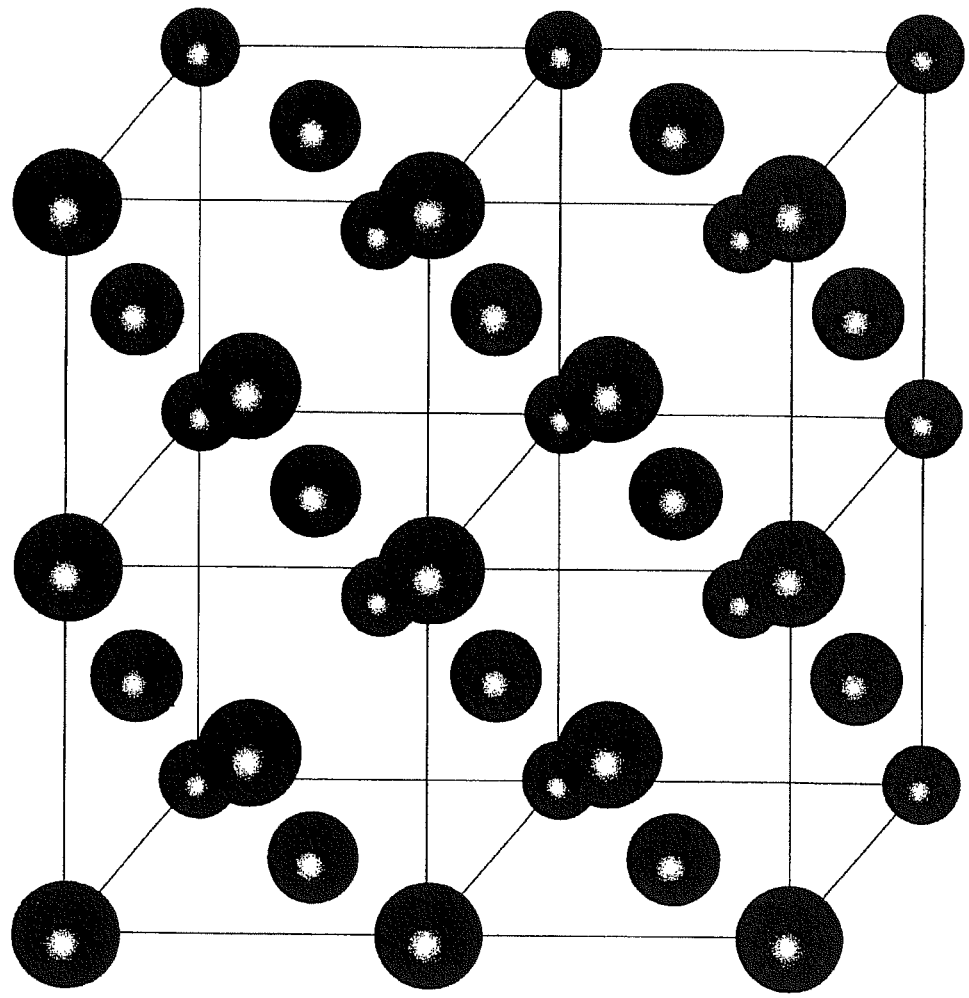
FIGS. 1a and 1b are perspective views of monodisperse, highly charged colloidal particles self-assembled to form three-dimensional ordered arrays known as CCA having a face-centered-cubic (fcc) lattice (shown) or a body-centered-cubic (bcc) lattice.
Figure 1B:
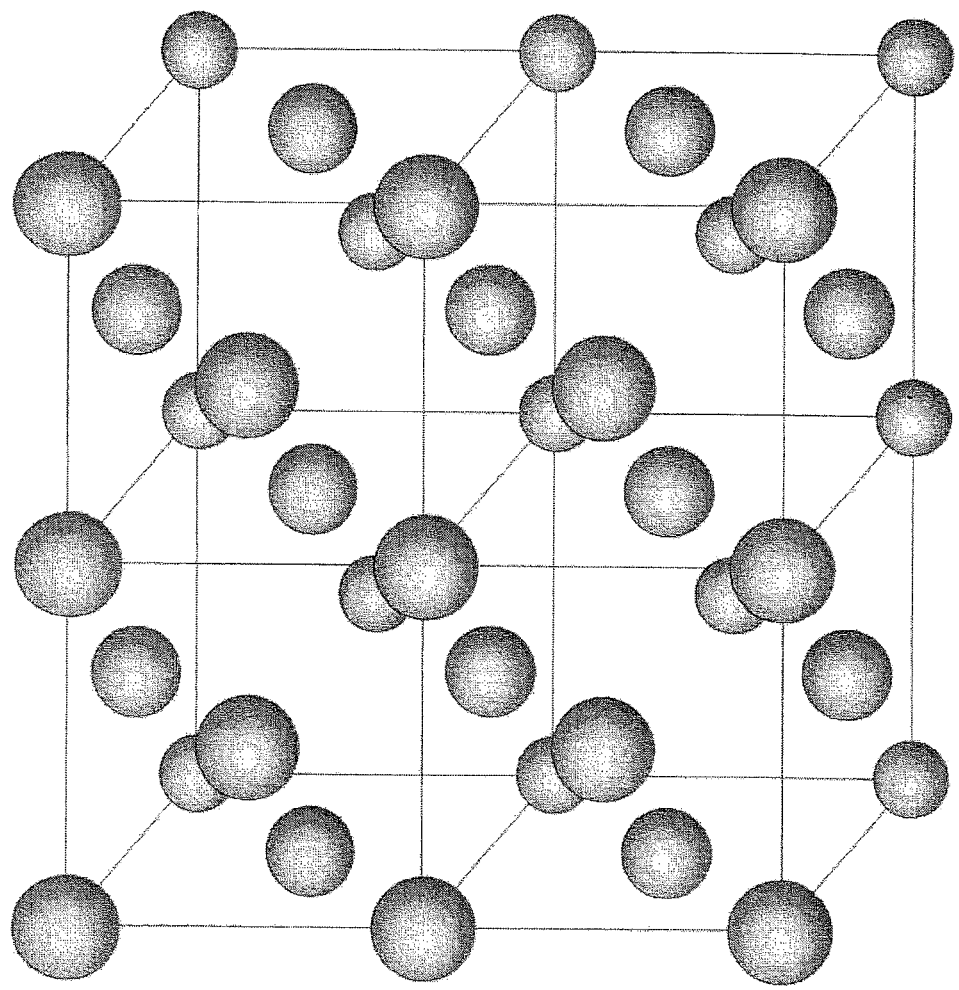

PBGCs according to preferred embodiments of the present disclosure have been fabricated that experimentally demonstrate the predicted optical properties of a 3-D PBGC by using a self-assembled crystalline colloidal array (CCA) motif to create submicron cubic periodic dielectric structures. Monodisperse, highly charged spherical particles dispersed in low ionic strength aqueous solutions self-assemble to form CCA due to electrostatic repulsions between colloidal particles. If the average interparticle spacing is comparable to or smaller than the Debye layer length the colloidal particles self-assemble into either a face-centered-cubic (fcc) or a body-centered-cubic (bcc) lattice to minimize the system free energy (FIG. 1). CCAs will self-assemble from any material synthesized as monodisperse colloidal particles with strong acid groups on their surface. This approach to forming PBGCs according to the present disclosure has distinct advantages over lithographic and layer-by-layer growth because CCAs are inherently three-dimensional and can self-assemble as large single crystals.

Figure 2:
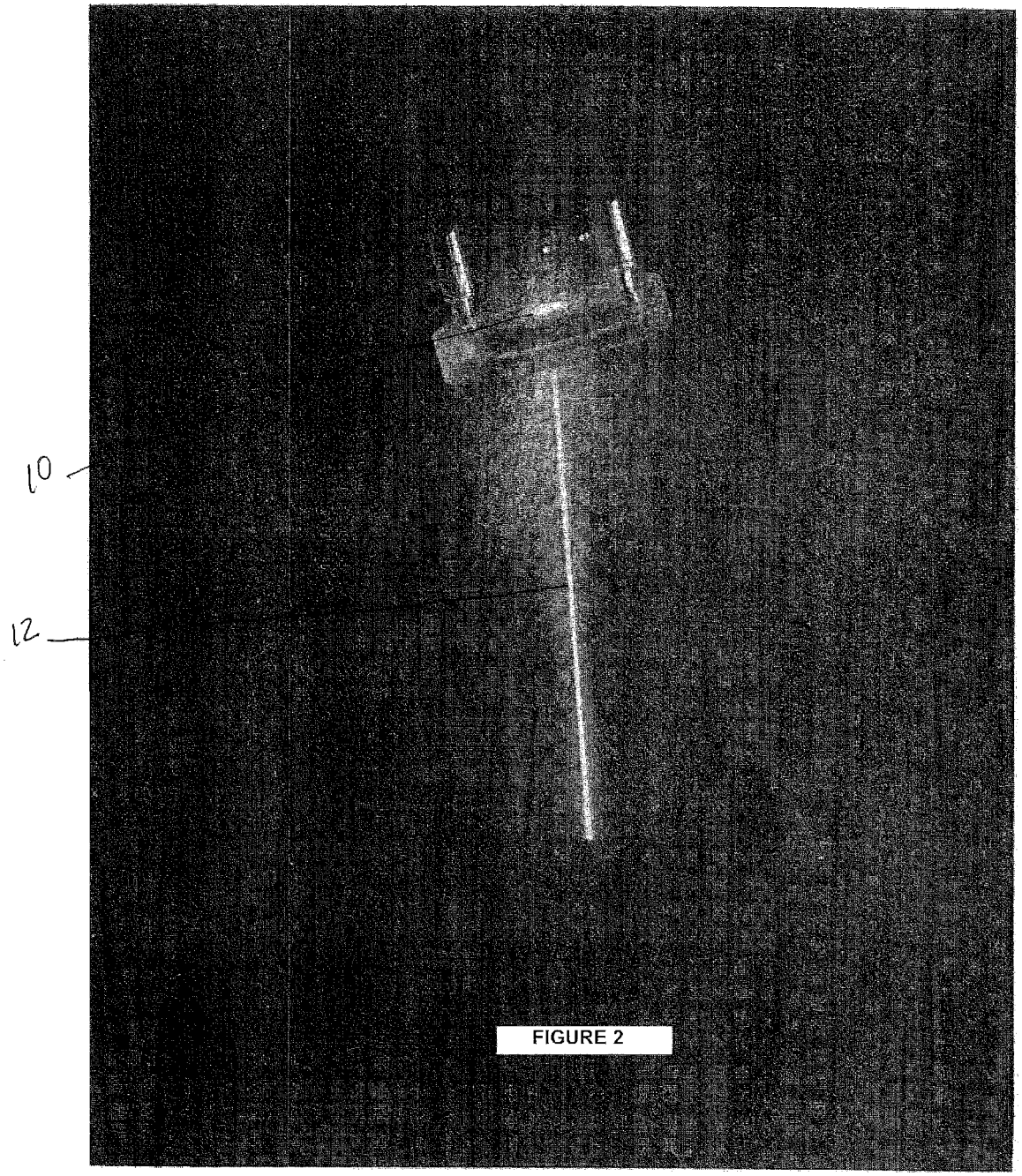
FIG. 2 shows diffraction of a laser beam by a PBGC of the present disclosure.

CCA photonic crystals Bragg diffract electromagnetic radiation whose wavelength in the material matches the lattice periodicity. Preferred CCAs according to the present disclosure generally have lattice constants between 100 and 500 nm, and therefore diffract UV, visible, and near-IR spectral region light (FIG. 2). Each set of CCA lattice planes has a diffraction condition specified by dynamical diffraction theory that depends on the lattice spacing, the incidence angle and the wavelength of incident light, and the refractive indices of the colloidal spheres and the solvent or medium. Multiple crystal planes can simultaneously satisfy these conditions.

Figure 3:
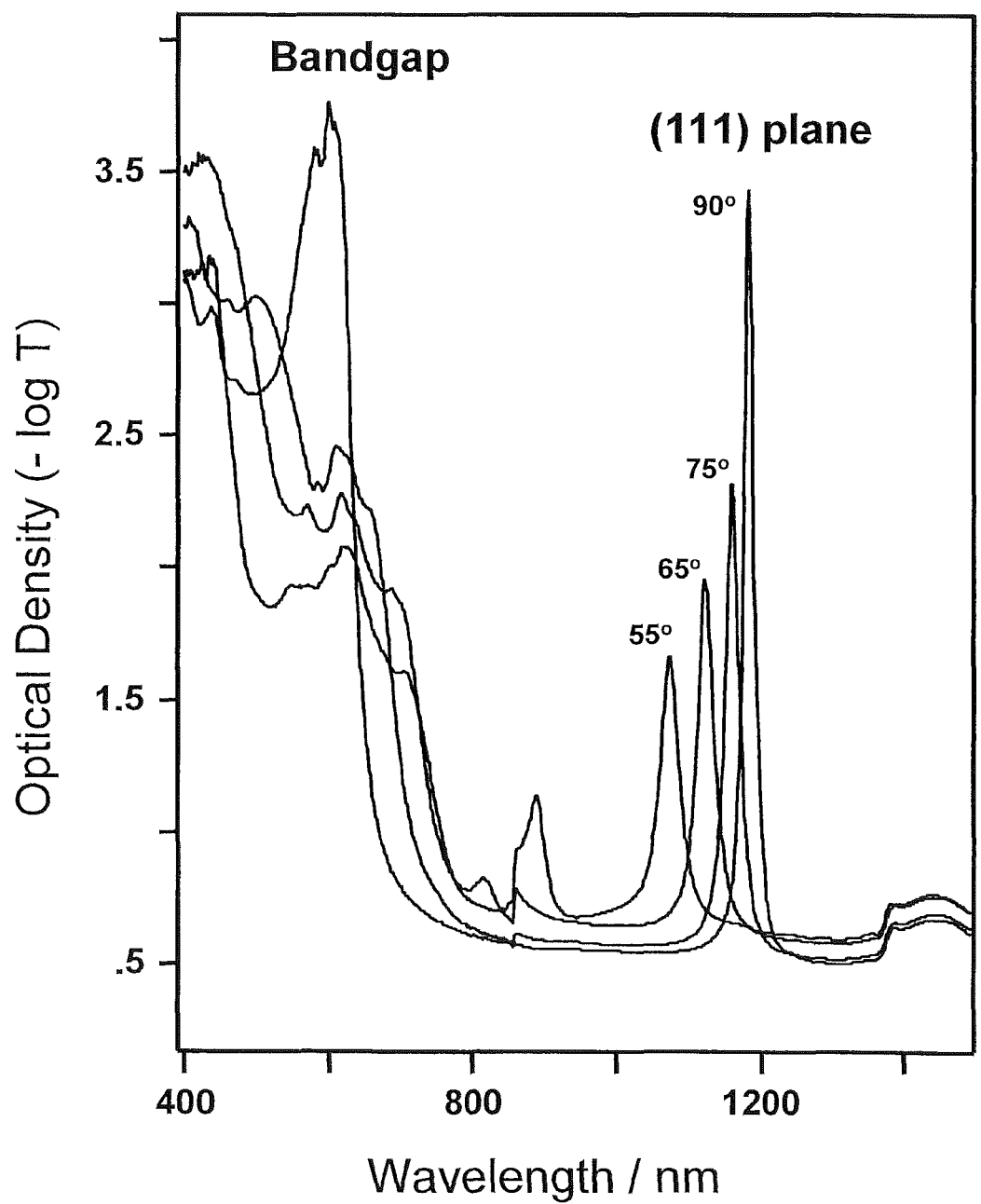
FIG. 3 is a graph showing extinction spectra of the PBGC of FIG. 2 as a function of incidence angles.

A CCA was fabricated according to a preferred embodiment of the present disclosure with an fcc lattice constant of 767 nm, composed of 270 nm diameter polystyrene colloidal particles in water that acts as a PBGC over much of the visible spectral region. FIG. 3 shows the PBGC extinction spectra, whose ordinate is the optical density, $D=-\log T$, where T is the transmittance. The extinction peaks resulted from the diffraction of incident light meeting the Bragg condition. There is no light absorption in the visible spectral region. The fcc (111) planes are the densest crystal planes and align parallel to the surface of the cell containing the CCA. At normal incidence these planes diffract in first order to give the sharp extinction maximum at ~1200 nm in the near-IR. This diffraction blue-shifts as the incident angle is rotated from the normal, as predicted by Bragg's Law. For normal incidence, a very broad band occurs in the visible spectral region between 500 and 750 nm, due to superposition of diffraction from the {(200), (020), (002), (220), (202), and (022)} planes. Incidence off of normal removes this superposition and individual diffraction peaks can be resolved. The spectra in FIG. 3 indicate that diffraction prevents any light from transmitting through the PBGC 10 of FIG. 2 and indicates the existence of a complete photonic bandgap for light at wavelengths less than about 700 nm. The PBGC 10 was also placed in a water tank to refractive index match the quartz cell and the CCA, to permit transmission of light over a large internal solid angle inside the PBGC. A solid cone of >60° was accessed and there was found no transmission of 488 or 514 nm light at any incident angle. This is a second independent demonstration of the expected properties of a 3-D PBGC according to the present disclosure.

The polystyrene CCA of the present disclosure functions as PBGC even though the refractive index difference between the polystyrene particles (n=1.59) and the water medium (n=1.33) is much less than theory expects, and despite the fact that fcc crystals are not expected to possess complete bandgaps. Previous diffraction studies demonstrated an increased CCA diffraction width and decreased efficiency compared to that theoretically expected for a perfect lattice; this results from the presence of defects and static strains and dynamic disorder within the CCA. The increased diffraction width caused by this disorder is likely to cause the formation of the photon bandgap. If diffraction bands from the numerous high Miller index planes widen and overlap, light will be diffracted at all incident angles for all wavelengths below a certain cutoff. The presence of disorder, however, decreases the diffraction efficiency. Thus, it is possible that under the present disclosure, perfect PBGCs are not present, with a zero density of photon states, but rather a pseudogap exists where the number of states is dramatically below that found within a homogeneous material. Further, strains in the fcc lattice are expected to destroy the degeneracy, which will remove the symmetry condition that prevents this lattice from acting as a PBGC.

Figure 4:
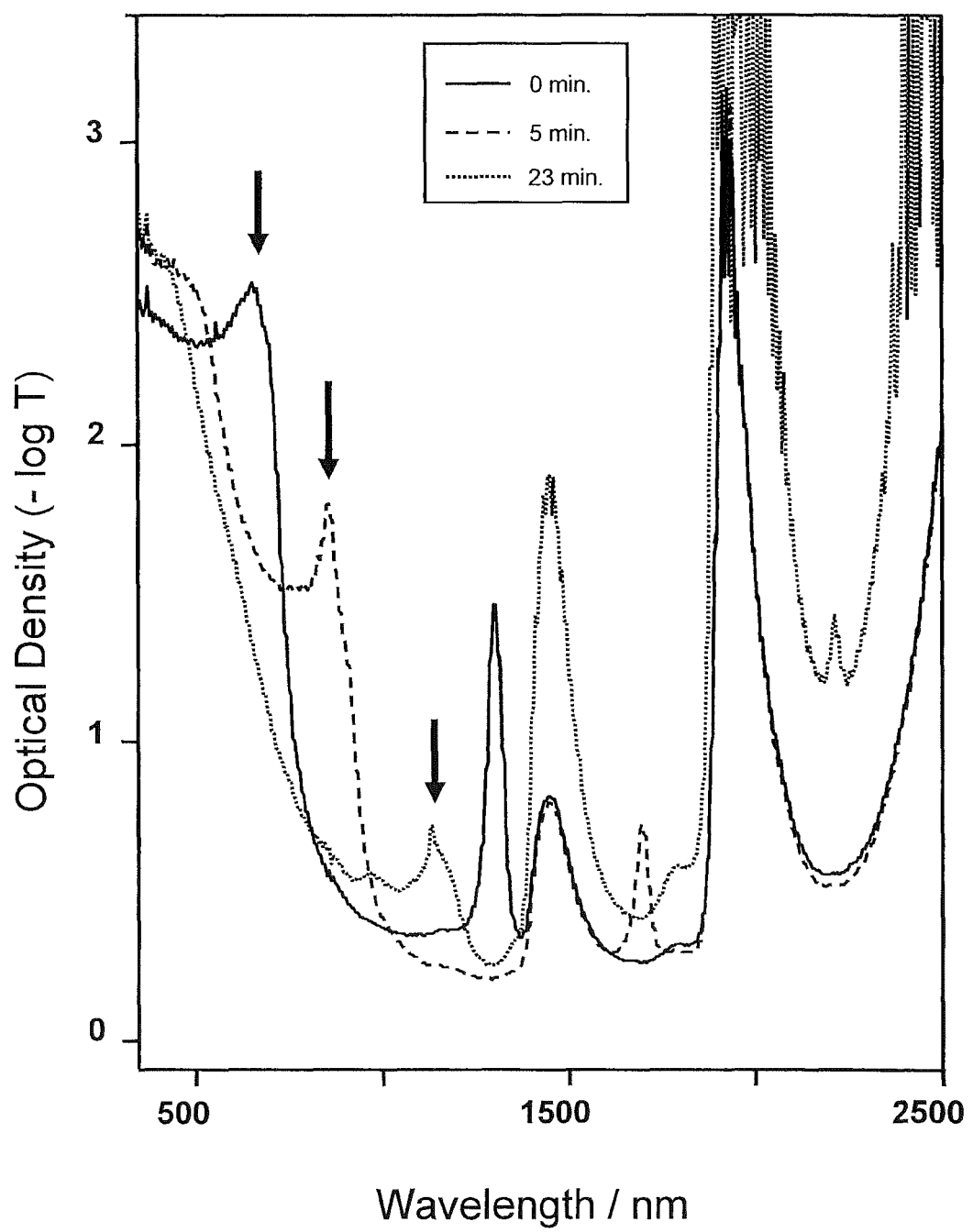
FIG. 4 is a graph showing the tuning of diffraction from a PCCA PBGC of the present disclosure.

Also, according to the present disclosure, environmentally responsive PBGCs are preferably fabricated by polymerizing CCA into hydrogel networks (PCCA). These PCCA lattice constants and diffraction wavelengths preferably can be tuned with temperature or binding of chemical species. Preferably, a wavelength-tunable PBGC was fabricated by polymerizing a polyacrylamide hydrogel around the CCA. FIG. 4 is illustrative of a PCCA according to the present disclosure which initially diffracts ~4300 nm light in first order at normal incidence, and functions as a PBGC for light below ~700 nm. Such PBGC was then hydrolyzed in base to replace hydrogel amides with carboxylates to immobilize anions onto the hydrogel. The resulting Donnan potential swelled the gel, increased the CCA lattice constant and red-shifted the diffraction (FIG. 4). Preferably, such PBGC according to the present disclosure can be accurately tuned by controlling the extent of hydrolysis. For example, 5 min. hydrolysis shifted the first order diffraction from ~1300 nm to 1700 nm, while the visible wavelength diffraction peak shifted to ~900 nm in the near IR. A 23 min. hydrolysis shifted the first order diffraction to ~2200 nm, while the ~900 nm band shifted to ~1200 nm and decreased in intensity. Thus, the PBGCs according to the present disclosure can be tuned into any desired spectral region.

The above-described acrylamide hydrolysis approach according to the present disclosure irreversibly alters the PCCA. However, the photonic bandgap of PBGCs according hereto may preferably be reversibly tuned thermally or chemically using our previously demonstrated methodologies. These methods allow dynamic control of the spectral bandgap of the PBGCs according to the present disclosure.

The 3-D polystyrene CCA and PCCA according to the present disclosure show complete bandgaps for visible light despite their small refractive index contrast and their fcc structure. These complete (pseudo)bandgaps are probably the result of static strains and disorder of the fcc crystal lattice.

The PBGCs and PBGC materials of the present disclosure diffract light throughout the visible spectral region for light incident over a large range of angles. The PBGCs and PBGC materials of the present disclosure can be solidified and particles made therefrom that diffract away light. Such particles are efficient white scattering materials and can be used as a replacement for other highly scattering materials, such as titanium dioxide, in paints and/or coatings. Preferably, the PBGCs of the present disclosure can be used in paints and/or coatings that scatter light for white paint but also can be used for color paint where particles block light by scattering.

Additionally, the PBGCs and/or PBGC materials of the present disclosure may preferably comprise, a self-assembled crystalline colloidal array (CCA) of monodisperse spherical particles having a face-centered-cubic (fcc) or a body-centered-cubic (bcc) lattice dispersed in a medium, where the particles comprise titanium dioxide, zinc sulfide or other materials having a high refractive index (generally greater than about 1.5).

EXAMPLES

The following examples are intended to illustrate the disclosure and should not be construed as limiting the disclosure in any way.

FIG. 2 shows diffraction of a 488 nm laser beam 12 by a PBGC 10 of the present disclosure. Diffraction from the fcc (111) planes of the CCA the PBGC 10 occurs in the near-IR (~1200 nm), while the higher index {(200), (020), (002), (220), (202), and (022)} planes simultaneously diffract the laser beam at a host of angles given by Bragg's law. Here, the PBGC 10 was immersed in a water tank containing scattering particles in order to visualize the incident and diffracted beams. Note that the incident beam does not transmit through the CCA of the PBGC 10.

FIG. 3 is a graph showing extinction spectra of the PBGC 10 of FIG. 2 as a function of incidence angles. At normal incidence the (111) planes diffract ~1200 nm light, while the {(200), (020), (002), (220), (202), and (022)} planes simultaneously diffract all light in the visible spectral region regardless of incident angle. The CCA the PBGC 10 was self-assembled from 270 nm polystyrene colloids in a 125 μm thick quartz cell.

FIG. 4 is a graph illustrating the tuning diffraction from a PCCA PBGC according to the present disclosure. Such PBGC PCCA was synthesized to initially have a ~700 nm photon bandgap edge. The PCCA was soaked in a 1.0 M NaOH/10% (v/v) TEMED solution and then returned to pure water. The dissociated carboxylates swell the hydrogel and red-shift the bandgap. The spectra show diffraction from the fcc (111) planes at ~1300 nm, ~1700 nm, and ~2200 nm after hydrolysis for 0, 5, and 23 minutes, respectively. The low energy bandgap edge shifts from ~700 nm to ~900 nm to ~1200 nm. The diffraction optical density decreases because the particle number density drops as the gel swells. The bands at ~1500 nm and ~2000 nm, which result from water absorption, increase due to the increasing water pathlength as the gel swells.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims In the foregoing Detailed Description, various features are grouped together in a single embodiment to streamline the disclosure. This method of disclosure is not to be interpreted as reflecting an intention that the claimed embodiments of the disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this disclosure may be made without departing from the principles and scope of the disclosure as expressed in the subjoined claims.

What is claimed is:

1. A photonic bandgap crystal or photonic bandgap crystal material comprising a self-assembled crystalline colloidal array (CCA) of monodisperse highly-charged spherical particles having a strong acid group on their surfaces dispersed in a medium and solidified, wherein the CCA has multiple ordered planes capable of diffracting light throughout one or more spectral regions for light incident over a plurality of angles, and wherein the photonic bandgap crystal or photonic bandgap crystal material has lattice constants and diffraction wavelengths tunable via temperature or hydrolysis or binding of chemical species.

2. The photonic bandgap crystal or photonic bandgap crystal material of claim 1 having a photonic bandgap for light in the visible and near-IR for light incident over the plurality of angles.

3. The photonic bandgap crystal or photonic bandgap crystal material of claim 1 having a photonic bandgap for light in the visible range of wavelengths less than about 700 nm.

4. The photonic bandgap crystal or photonic bandgap crystal material of claim 1, wherein the monodisperse spherical particles comprise polystyrene.

5. The photonic bandgap crystal or photonic bandgap crystal material of claim 1, further comprising a polymerized CCA in a hydrogel.

6. The photonic bandgap crystal or photonic bandgap crystal material of claim 5, comprising a self-assembled CCA of monodisperse highly-charged polystyrene spheres polymerized in an acrylamide hydrogel.

7. The photonic bandgap crystal or photonic bandgap crystal material of claim 6, wherein the acrylamide hydrogel is partially hydrolyzed.

8. The photonic bandgap crystal or photonic bandgap crystal material of claim 6, wherein the acrylamide hydrogel volume or the CCA lattice constant is tunable via hydrolysis.

9. The photonic bandgap crystal or photonic bandgap crystal material of claim 5, wherein the photonic bandgap spectral region is reversibly tunable.

10. The photonic bandgap crystal or photonic bandgap crystal material of claim 1, wherein the refractive index of the spherical particles is different, smaller or greater than the refractive index of the medium.

11. A method of forming a photonic bandgap crystal or photonic bandgap crystal material comprising the step of:
    self-assembling, in a liquid medium, monodisperse highly-charged spherical particles having a strong acid group on their surfaces into a crystalline colloidal array (CCA), wherein the CCA has multiple ordered planes capable of diffracting light throughout one or more spectral regions for light incident over a plurality of angles; and solidifying the medium, and
    wherein the photonic bandgap crystal or photonic bandgap crystal material has lattice constants and diffraction wavelengths tunable via temperature or hydrolysis or binding of chemical species.

12. The method of claim 11, further comprising polymerizing a hydrogel polymer around the CCA and hydrolyzing the hydrogel in-whole or in-part.

13. The method of claim 12, wherein the monodisperse highly-charged spherical particles comprise polystyrene and the hydrogel comprises polyacrylamide.

14. The method of claim 11, wherein the photonic bandgap crystal or photonic bandgap crystal material has a bandgap for light in the visible and near-IR for light incident over the plurality of angles.

15. The method of claim 11, wherein the photonic bandgap crystal or photonic bandgap crystal material has a photonic bandgap for light in the visible range of wavelengths less than about 700 nm.

16. Light scattering particles for use in paints and coatings, comprising: a material comprising a self-assembled crystalline colloidal array (CCA) of monodisperse highly-charged spherical particles having a strong acid group on their surface dispersed in a medium, solidified and produced into the light scattering particles;
    wherein the CCA has multiple ordered planes that diffract light throughout one or more spectral regions for light incident over a plurality of angles, and
    wherein the material has lattice constants and diffraction wavelengths tunable via temperature or hydrolysis or binding of chemical species.

17. The light scattering particles of claim 16, wherein the material has a photonic bandgap for light in the visible and near-IR for light incident over the plurality of angles.

18. The light scattering particles of claim 16, wherein the material has a photonic bandgap for light in the visible range of wavelengths less than about 700 nm.

19. A paint or coating comprising a base and the light scattering particles of claim 16.

* * * * *